US007412572B1

(12) United States Patent
Shavit et al.

(10) Patent No.: US 7,412,572 B1
(45) Date of Patent: Aug. 12, 2008

(54) MULTIPLE-LOCATION READ, SINGLE-LOCATION WRITE OPERATIONS USING TRANSIENT BLOCKING SYNCHRONIZATION SUPPORT

(75) Inventors: Nir N. Shavit, Cambridge, MA (US); Ori Shalev, Giv'at Shmuel (IL)

(73) Assignee: Sun Microsystems, Inc., Santa Clara, CA (US)

( * ) Notice: Subject to any disclaimer, the term of this patent is extended or adjusted under 35 U.S.C. 154(b) by 351 days.

(21) Appl. No.: 10/965,336

(22) Filed: Oct. 14, 2004

Related U.S. Application Data

(63) Continuation-in-part of application No. 10/918,062, filed on Aug. 13, 2004.

(60) Provisional application No. 60/554,197, filed on Mar. 17, 2004.

(51) Int. Cl.
*G06F 12/00* (2006.01)
(52) U.S. Cl. .................. 711/152; 711/167; 709/213
(58) Field of Classification Search ............. None
See application file for complete search history.

(56) References Cited

U.S. PATENT DOCUMENTS

| | | | |
|---|---|---|---|
| 4,561,051 A | 12/1985 | Rodman et al. | |
| 4,858,116 A * | 8/1989 | Gillett et al. | ............ 711/155 |
| 5,301,290 A | 4/1994 | Tetzlaff et al. | |
| 5,428,761 A | 6/1995 | Herlihy et al. | |
| 5,875,342 A | 2/1999 | Temple | |
| 5,892,955 A | 4/1999 | Ofer | |
| 5,991,845 A | 11/1999 | Bohannon et al. | |
| 6,370,625 B1 | 4/2002 | Carmean et al. | |
| 6,745,274 B1 | 6/2004 | Snyder et al. | |
| 6,782,452 B2 | 8/2004 | Williams, III | |
| 6,958,507 B2 * | 10/2005 | Atwood et al. | ............ 257/296 |
| 2002/0078307 A1 | 6/2002 | Zahir | |
| 2002/0188590 A1 | 12/2002 | Curran et al. | |
| 2004/0015642 A1 | 1/2004 | Moir et al. | |
| 2005/0038964 A1 * | 2/2005 | Hooper et al. | ............ 711/143 |
| 2006/0036850 A1 * | 2/2006 | Enokida | ............ 713/156 |

OTHER PUBLICATIONS

Maurice Herlihy, A Methodology for Implementing Highly Concurrent Data Objects, ACM Transactions on Programming Languages and Systems, vol. 15, No. 5, Nov. 1993, pp. 745-770.
Nir Shavit, et al., Elimination Trees and The Contraction of Pools and Stacks, 7th Annual Symposium on Parallel Algorithms and Architectures (SPAA), Feb. 28, 1996, 30 pages.
Thomas E. Anderson, The Performance of Spin Lock Alternatives for Shared-Memory Multiprocessors, IEEE Transactions on Parallel and Distributed Systems, vol. 1, No. 1, Jan. 1990, pp. 6-16.

(Continued)

*Primary Examiner*—Reginald G. Bragdon
*Assistant Examiner*—Ngoc V Dinh
(74) *Attorney, Agent, or Firm*—Osha·Liang LLP

(57) ABSTRACT

A multiple-location read, single-location write operation is implemented using transient blocking synchronization support. The multiple-location read, single-location write operation involves first acquiring transient ownership of a memory location to be modified and then acquiring transient ownership of at least one other memory location, the contents of which are read and used to modify the memory location first acquired.

22 Claims, 3 Drawing Sheets

OTHER PUBLICATIONS

Maged M. Michael. Safe Memory Reclamation for Dynamic Lock-Free Objects Using Atomic Reads and Writes. PODC 2002 Jul. 21-24, 2002.

John M. Mellor-Crummey, et al. Algorithms for Scalable Synchronization on Shared-Memory Multiprocessors. ACM Transactions on Computer Systems, vol. 9, No. 1, Feb. 1991, pp. 21-65.

Maged M. Michael, et al. Nonblocking Algorithms and Preemption-Safe Locking on Multiprogrammed Shred Memory Multiprocessors. Journal of Prallel and Distributed Computing 51, Article No. PC981446, 1998, pp. 1-26.

Maurice P. Herlihy, et al. Linearizability: A Correctness Condition for Concurrent Objects. ACM Transactions on programming Languages and Systems, vol. 12, No. 3, Jul. 1990, pp. 463-492.

Maurice Herlihy, et al. The Repeat Offender Problem: A Mechanism for Supporting Dynamic-Sized Lock-Free Data Structures. Jul. 2002, 15 pages.

Maurice Herlihy, et al. Scalable Concurrent Counting. In the Proceedings of the 3rd Annual ACM Symposium on Parallel Algorithms and Architectures, Jul. 1992, pp. 1-31.

Nir Shavit, et al. A Steady State Analysis of Diffracting Trees. Jul. 15, 1997, pp. 1-26.

Nir Shavit, et al. Diffracting Trees. In the Proceedings of the Annual Symposium on Parallel Algorithms and Architectures (SPAA), Jun. 1994, p. 0-49.

Nir Shavit, et al. Combining Funnels: A Dynamic Approach To Software Combining. Principals of Distributed Computing (PODC98). Jul. 6, 1999, pp. 1-30.

Beng-Hong Lim, et al. Waiting Algorithms for Synchronization in Large-Scale Multiprocessors. ACM Transactions on Computer Systems, vol. 11, No. 3, Aug. 1993, pp. 1-39.

Maged M. Michael, et al. Simple, Fast, and Practical Non-Blocking and Blocking Concurrent Queue Algorithms. Feb. 1996, 8 pages.

Ravi Rajwar, et al. Speculative Lock Elision: Enabling Highly Concurrent Multithreaded Execution. In the proceedings of the 34th International Symposium on Microarchitechture (MICRO), Dec. 3-5, 2001, 12 pages.

John D. Valois. Implementing Lock-Free Queues. In proceedings of the Seventh International Conference on Parallel and Distributed Computing Systems, Las Vegas, NV, Oct. 1994, pp. 1-9.

Sundeep Prakash, et al. Non-Blocking Algorithms for Concurrent Data Structures. Jul. 1, 1991, pp. 1-40.

John M. Mellor-Crummey, et al. Algorithms for Scalable Synchronization on Shared-Memory Multiprocessors. Jan. 1991, 42 pages.

Peter Magnusson, et al. Queue Locks on Cache Coherent Multiprocessors. 1994, 7 pages.

Travis S. Craig. Building FIFO and Priority-Queuing Spin Locks from Atomic Swap. Feb. 1, 1993, pp. 1-29.

Yehuda Afek, et al. Atomic Snapshots of Shred Memory. pp. 1-21. A Preliminary version of this paper appeared In the *Proceedings of the 9th Annual ACM Symposium on Principles of Distributed Computing*, (Quebec City, Quebec, August) ACM, New York, 1990, pp. 1-14.

Ole Agesen, et al. DCAS-Based Concurrent Deques. Jul. 2000, 10 pages.

Maurice Herlihy. Wait-Free Synchronization. ACM Transactions on Programming Languages and Systems, vol. 11, No. 1, Jan. 1991, pp. 124-149.

Mark Moir. Practical Implementations of Non- Blocking Synchronization Primitives. Aug. 1997, 10 pages.

Maurice Herlihy, et al. Obstruction-Free Synchronization: Double-Ended Queues as an Example. 2003, 8 pages.

Gray, et al.; "Leases: An Efficient Fault-Tolerant Mechanism for Distributed File Cache Consistency"; ACM pp. 202-204, 1989.

Handy, J., the Cache Memory book, 2nd edition, 1998, pp. 29-31, 67, 138-141, 146-147.

* cited by examiner

MULTIPLE-LOCATION READ, SINGLE-LOCATION WRITE OPERATIONS USING TRANSIENT BLOCKING SYNCHRONIZATION SUPPORT

CROSS-REFERENCE TO RELATED APPLICATIONS

This application is a continuation-in-part of U.S. patent application Ser. No. 10/918,062, entitled "Transient Blocking Synchronization" and filed on Aug. 13, 2004, and hereby incorporates by reference the entirety of that application Further, this application contains subject matter that may be related to the subject matter in the following U.S. applications assigned to the assignee of this application: U.S. patent application Ser. No. 10/966,376, entitled "Transactional Memory for Transient Blocking Synchronization" and filed on Oct. 15, 2004; U.S. patent application Ser. No. 11/078,120, entitled "Exclusive Lease Instruction Support for Transient Blocking Synchronization" and filed on Mar. 11, 2005; U.S. patent application Ser. No. 11/078,117, entitled "Shared Lease Instruction Support for Transient Blocking Synchronization" and filed on Mar. 11, 2005; and U.S. patent application Ser. No. 11/088,290, entitled "Transient Blocking Synchronization Support in a Cache-coherent Multiprocessor System" and filed on Mar. 24, 2005.

BACKGROUND OF INVENTION

A modern computer system has at least a microprocessor and some form of memory. Generally, the processor processes retrieves data stored in the memory, processes/uses the retrieved data to obtain a result, and stores the result in the memory.

One type of computer system uses a single processor to perform the operations of the computer system. In such a single processor (or "uniprocessor") computer system, incoming memory requests to memory occur serially. However, as described below with reference to FIG. 1, in a computer system that uses multiple processors at least partly in order to increase data throughput, due to parallel processing (i.e., simultaneous processing by two or more processors), memory shared by multiple processors may receive multiple memory requests that overlap in both time and space.

FIG. 1 shows a typical multiprocessor system 100. In FIG. 1, multiple processors 102a, 102b share a memory 106, where the memory 106 includes memory locations 106a-106n. An important consideration in multiprocessor system design involves the potential of two or more processors attempting to access and/or store data in the same memory location at the same time. Thus, designers have implemented, using both software and/or hardware, various "synchronization" techniques to address the issue of threads (i.e., sequences of instructions being processed by a processor) concurrently attempting to access the same memory location.

Synchronization can be implemented by a processor "blocking" other processors from accessing or storing data to a particular memory location, i.e., a processor maintains exclusive, uninterruptible ownership of a particular memory location. However, maintaining exclusive ownership of a memory location results in a high number of failures and deadlocks, particularly for large-scale multiprocessor systems (e.g., systems having thousands of processors running in parallel). Such large-scale multiprocessor systems tend to require higher levels of robustness and tolerance than that provided by blocking synchronization techniques due to increased delays and fluctuations in communication time and the effects of fast context switching typical of large-scale multiprocessor systems.

At least partly in order to address the drawbacks of blocking synchronization techniques, "non-blocking" synchronization techniques have emerged that allow multiple processors to access concurrent objects in a non-mutually exclusive manner to meet the increased performance requirements of large-scale multiprocessor systems. The concept of non-blocking may be implemented through hardware and software components in a variety of ways. For example, in the multiprocessor system shown in FIG. 2, a combination of instruction primitives and registers is used to achieve non-blocking synchronization in a multiprocessor system.

In FIG. 2, a processor 102a sends a Load-Linked request to a controller 104a to load a value from a memory location (e.g., 106a), which, in turn, sets a bit associated with the memory location. The controller 104a issues a response to the request indicating that the value of the memory location has been successfully loaded. Once the value has been successfully loaded, the processor 102a executes one or more instructions to manipulate the loaded value. The processor 102a then issues a Store-Conditional request that attempts to store the manipulated value back to the memory location (e.g., 106a). However, the value is only stored to that memory location if the associated bit in the controller 104a has not been unset (i.e., if no other processor has written to the memory location since the Load-Linked request). If the Store-Conditional request succeeds, this indicates that all three steps occurred atomically (i.e., as a single, uninterrupted sequence). On the other hand, if the Store-Conditional request fails, the data is not stored in that memory location and the Load-Linked request must be retried.

The implementation of the Load-Linked/Store-Conditional primitives in non-blocking synchronization has two distinct features. First, all Load-Linked requests are required to succeed. Secondly, all Load-Linked requests require some sort of recording (or tracking).

Recording Load-Linked requests may require that a controller notify all processors that initiated Load-Linked requests whenever a Store-Conditional request invalidates them, essentially mimicking a cache coherence protocol. Alternatively, a record may be maintained in each controller for every initiated Load-Linked request. In this case, the Load-Linked request is only removed from the record of the controller once a successful Store-Conditional request occurs. Because the completion of a Store-Conditional request cannot be forecasted, the latter option requires support for lists of unbounded size, which complicates controller design and creates performance bottlenecks whenever a Load-Linked request is initiated.

Another type of non-blocking synchronization technique involves the use of Compare&Swap primitives. A Compare&Swap operation typically accepts three values, or quantities: a memory address A, a comparison value C, and a new value N. The operation fetches and examines the contents V of memory at address A. If those contents V are equal to C, then N is stored into the memory location at address A, replacing V. A boolean return value indicates whether the replacement occurred. Depending on whether V matches C, V is returned or saved in a register for later inspection (possibly replacing either C or N depending on the implementation).

The Load-Linked/Store-Conditional and Compare&Swap operations described above are recognized as types of Read-Modify-Write operations, which are generally operations that read a value of a memory location (e.g., a single word having a size that is system specific), modify the memory location, and write the modified value back to the memory location. Typical Read-Modify-Write operations do not hold ownership and must optimistically check to make sure they were not interrupted, thereby possibly introducing implementation and user-level problems that require costly solutions and/or weakened semantics. Further, these non-blocking synchronization implementations put the burden of coordination on the threads and are typically incompatible with fast context-switching, which is an important technology often used in hiding memory access latencies in large-scale multiprocessor systems.

SUMMARY OF INVENTION

According to one aspect of one or more embodiments of the present invention, a computer system comprises: a first processor and a second processor capable of executing processes concurrently; and a set of memory locations shared by the first processor and the second processor, where, in response to a request by the first processor to perform a multiple-location read, single-location write synchronization operation, a set of memory locations is transiently restricted from being accessed by the second processor.

According to another aspect of one or more embodiments of the present invention, a shared-memory multiprocessor computer system having instructions for synchronizing operations on memory comprises instructions to: request exclusive access to a memory location for a first predetermined amount of time; if the request to the memory location is granted, request exclusive access to at least one other memory location for a second predetermined amount of time; and if the request to the at least one other memory location is granted, modify the memory location dependent on the at least one other memory location.

According to another aspect of one or more embodiments of the present invention, a method of performing computer system operations comprises: attempting to access a value in a memory location by a process in a shared-memory multiprocessor system; if the memory location is accessible, restricting another process from accessing the memory location for a first predetermined amount of time; attempting to access a value in at least one other memory location by the process; if the at least one other memory location is accessible, restricting the another process from accessing the at least one other memory location for a second predetermined amount of time; and during the first predetermined amount of time, modifying the memory location dependent on the at least one other memory location.

According to another aspect of one or more embodiments of the present invention, a computer system comprises (i) a plurality of processors, (ii) a memory shared by the plurality of processors, the memory comprising a first memory location and a second memory location; and (iii) a controller configured to: in response to one of the plurality of processors, request exclusive access to the first memory location for a first predetermined amount of time; if the request to the first memory location is granted, request exclusive access to the second memory location for a second predetermined amount of time; and if the request to the second memory location is granted, modify the first memory location dependent on the second memory location.

Other aspects and advantages of the invention will be apparent from the following description and the appended claims.

DETAILED DESCRIPTION

As described in U.S. patent application Ser. No. 10/918, 062 referenced above, transient blocking synchronization allows for the implementation of a universal non-blocking Read-Modify-Write operation. As described below, embodiments of the present invention relate to a technique for implementing a non-blocking multiple-location read, single-location write operation using transient blocking synchronization. A non-blocking multiple-location read, single-location write operation in accordance with embodiments of the present invention atomically (i) reads and transiently holds x memory locations and (ii) modifies one of the x memory locations.

Figure 1:
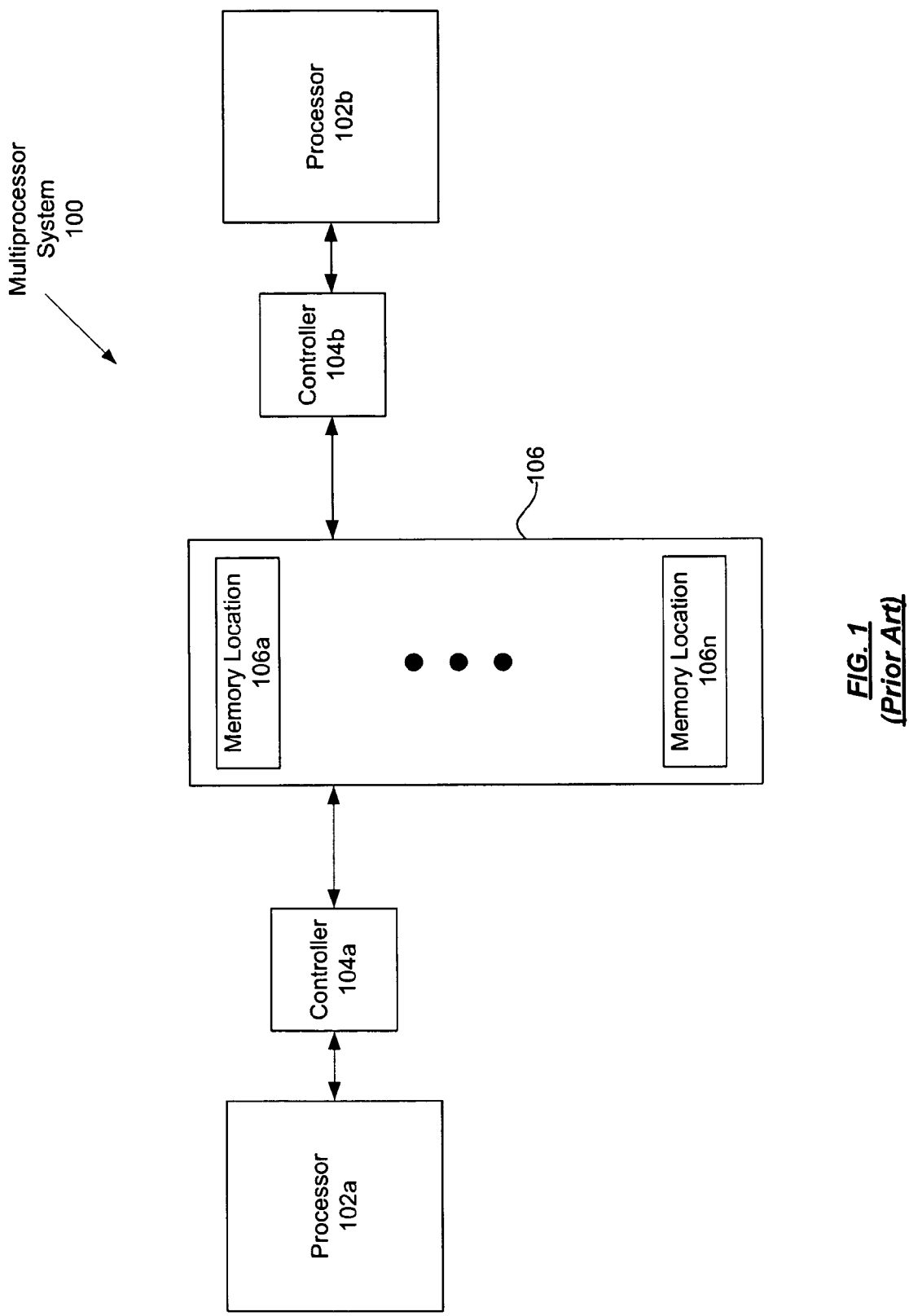
FIG. 1 shows a portion of a typical shared-memory multiprocessor system.
Figure 2:
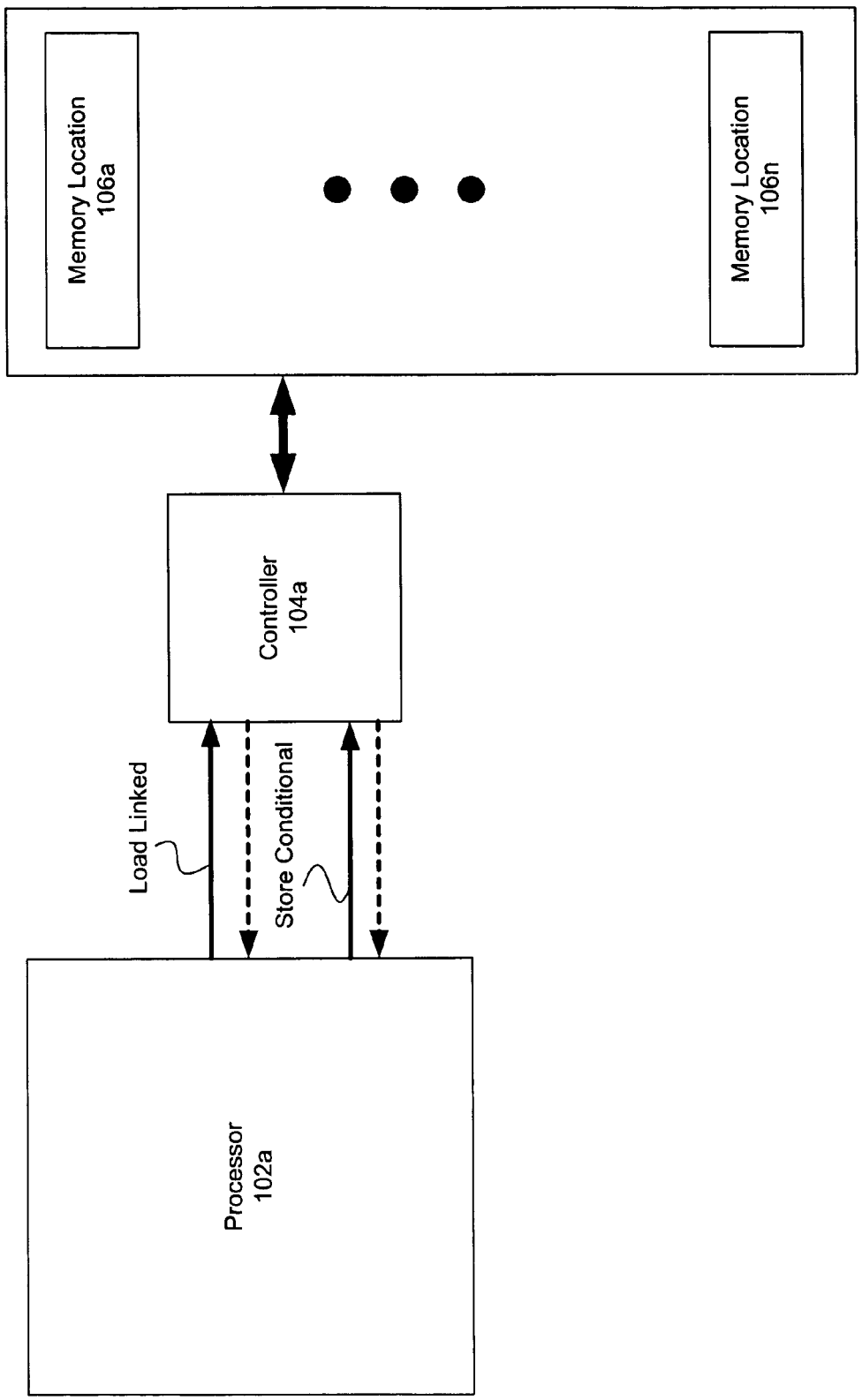
FIG. 2 shows a portion of a typical shared-memory multiprocessor system that uses non-blocking synchronization.
Figure 3:
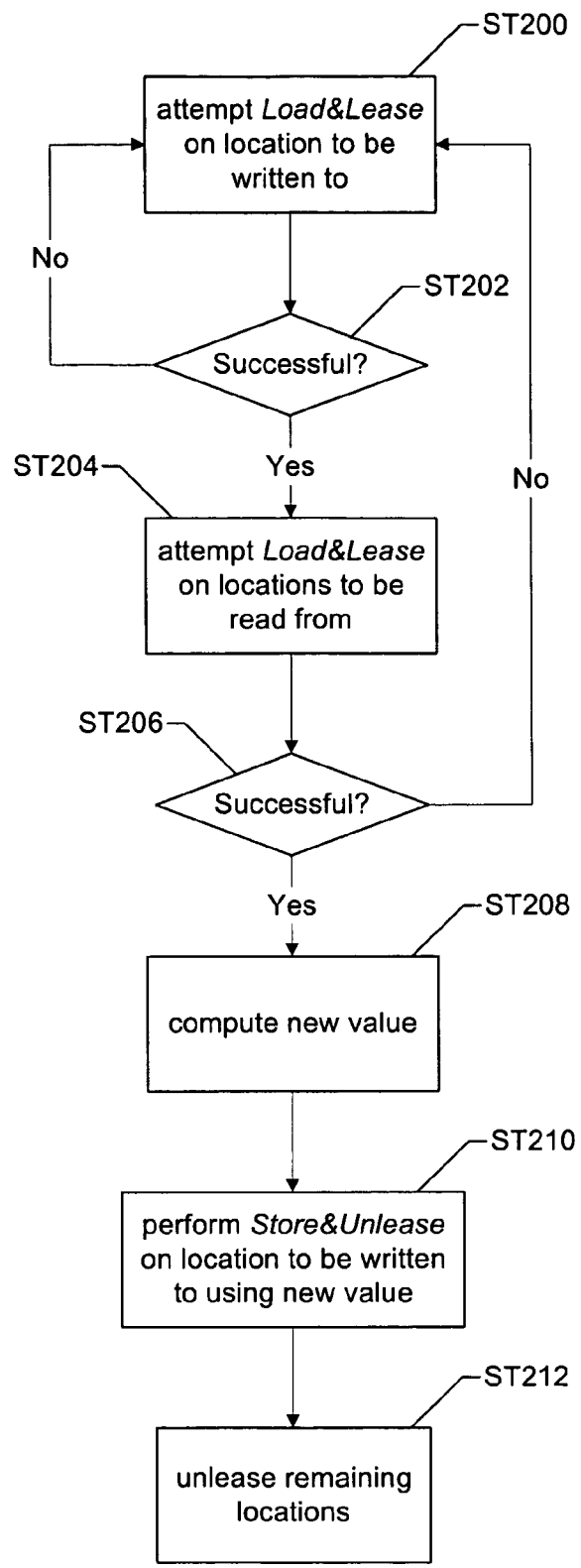
FIG. 3 shows a flow process in accordance with an embodiment of the present invention.

FIG. 3 shows an exemplary flow process in accordance with an embodiment of the present invention. In general, FIG. 3 shows a multiple-location read, single-location write operation in which relevant memory locations are transiently blocked to allow one of the memory locations to be modified with a value determined dependent on reading the contents of the memory locations. In ST200, a Load&Lease operation is attempted on a first memory location, which is the memory location being modified. In other words, a multiple-location read, single-location write operation in accordance with an embodiment of the present invention first leases that memory location which is being modified. If the Load&Lease operation in ST200 is not successful as determined in ST202 (i.e., transient ownership of the memory location is not granted), the Load&Lease operation in ST200 may be retried.

If the Load&Lease operation in ST200 is successful as determined in ST202 (i.e., transient ownership of the memory location is granted), Load&Lease operations are attempted on one or more other memory locations in ST204, where the contents of these memory locations need to be read in order to compute the new value for the memory location leased in ST200. If the Load&Lease operations in ST204 are not successful as determined in ST206, the operation fails and the Load&Lease operation in ST200 may be retried.

If the Load&Lease operations in ST204 are successful as determined in ST206, in ST208, the new value for the memory location leased in ST200 is computed using values read from the memory locations leased in ST200 and/or ST204. Once the new value has been computed in ST208, in ST210, a Store&Unlease operation is performed on the memory location leased in ST200 to (i) store the new value in that memory location and (ii) unlease that memory location. Thereafter, in ST212, the memory locations leased in ST204 are unleased using, e.g., Unlease operations.

Exemplary pseudo-code for a multiple-location read, single-location write operation in accordance with an embodiment of the present invention is shown and described below. In general, the operating process leases all relevant locations, where the location being modified (addr1) is the first to be leased.

```
1   if Load&Lease(addr1, &v1, T) then
2       if Load&Lease (addr2, &v2, T + ϵ) and
            Load&Lease (addr3, &v3, T + ϵ) and
            Load&Lease (addr4, &v4, T + ϵ) then
3           newval = compute (v1, v2, v3, v4)
4           Store&Unlease(addr1, newval)
5           Unlease(addr2)
6           Unlease(addr3)
7           Unlease(addr4)
8       end if
9   end if
```

In line 1, a Load&Lease operation is used to (i) lease memory location addr1 for a time period T and (ii) read contents v1 of memory location addr1. In line 2, Load&Lease operations are used to (i) lease memory locations addr2, addr3, and addr4 for a time period T+ϵ and (ii) read contents v2, v3, and v4 of memory locations addr2, addr3, and addr4, respectively. If the Load&Lease operations in lines 1 and 2 are successful, then, in line 3, a value newvalue is computed using the read contents v1, v2, v3, and v4 of memory locations addr1, addr2, addr3, and addr4, respectively. In line 4, a Store&Unlease operation is used to (i) store newvalue in memory location addr1 and (ii) unlease memory location addr1. Then, in lines 5-7, Unlease operations are used to unlease memory locations addr2, addr2, and addr3.

Because memory location addr1 is the first memory location to be leased, its timer would be the first to expire. This guarantees that if the Store&Unlease operation in line 4 is successful, none of the other memory locations, i.e., memory locations addr2, addr3, and addr4, could have been modified by a different process while newvalue was computed and stored in memory location addr1.

In one or more embodiments of the present invention, at least partly in order to avoid relying on the ability of several separate clocks to time a short interval without a drift, the lease intervals of all the memory locations not being modified are set to be longer, by ϵ, than the lease interval of the first leased memory location, i.e., the memory location being modified. For example, with reference to the pseudo-code shown above, in line 2, the lease intervals of memory locations addr2, addr3, and addr4 are set to be equal to T+ϵ, where T is the lease interval of memory location addr1 as set in line 3, and where ϵ may be set to be greater than any significant clock drift that may occur while a lease is active.

Accordingly, those skilled in the art will note that, in one or more embodiments of the present invention, because local timers (implemented either in hardware or software) are used to clock the lease intervals of the various memory locations leased as part of a multiple-location read, single-location write operation, the multiple-location read, single-location write operation may not be dependent on global time.

Advantages of the present invention may include one or more of the following. In one or more embodiments of the present invention, transient blocking synchronization may be used to provide support for a multiple-location read, single-location write operation.

In one or more embodiments of the present invention, a multiple-location read, single-location write operation using transient blocking synchronization support may be a non-blocking operation.

In one or more embodiments of the present invention, because a multiple-location read, single-location write operation requires that a memory location being modified is not leased by another process, a new value for the memory location is computed and stored in an atomic, i.e., linearizable, fashion.

In one or more embodiments of the present invention, a multiple-location read, single-location write operation using transient blocking synchronization support may use different timers for locations leased as part of the multiple-location read, single-location write operation.

In one or more embodiments of the present invention, a multiple-location read, single-location write operation using transient blocking synchronization support may be implemented as a universal synchronization operation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system, comprising:
   a first processor and a second processor capable of executing processes concurrently; and
   a set of memory locations shared by the first processor and the second processor,
      wherein, in response to a request by the first processor to perform a multiple-location read, single-location write synchronization operation, the set of memory locations is restricted from being accessed by the second processor,
      wherein the set of memory locations comprises a memory location to be modified and at least one memory location to be read,
      wherein the memory location to be modified is restricted from being accessed for a first predetermined amount of time and the at least one memory location to be read is restricted from being accessed for a second predetermined amount of time.

2. The computer system of claim 1, wherein the memory location to be modified by the multiple-location read, single-location write synchronization operation is restricted from being accessed by the second processor prior to the at least one memory location to be read being restricted from being accessed by the second processor.

3. The computer system of claim 2, wherein a modification of the memory location to be modified is dependent on contents of the at least one memory location to be read.

4. The computer system of claim 2, wherein the first predetermined amount of time is set to expire before the second predetermined amount of time.

5. The computer system of claim 1, wherein another request to perform a multiple-location read, single-location write synchronization operation on another memory location in the set of memory locations is queued when the memory location is restricted from being accessed.

6. A shared-memory multiprocessor computer system having instructions for synchronizing operations on memory, the instructions comprising instructions to:
   request exclusive access to a memory location for a first predetermined amount of time;
   if the request to the memory location is granted, request exclusive access to at least one other memory location for a second predetermined amount of time; and
   if the request to the at least one other memory location is granted, modify the memory location dependent on contents of the at least one other memory location.

7. The shared-memory multiprocessor computer system of claim 6, wherein the first predetermined amount of time is equal to the second predetermined amount of time.

8. The shared-memory multiprocessor computer system of claim 6, wherein the first predetermined amount of time is shorter than the second predetermined amount of time.

9. The shared-memory multiprocessor computer system of claim 6, further comprising instructions to:
queue a request to access at least one of the memory location and the at least one other memory location, the request being invoked during at least one of the first predetermined amount of time and the second predetermined amount of time.

10. A method of performing computer system operations, comprising:
attempting to access a value in a first memory location by a first process in a shared-memory multiprocessor system;
if the first memory location is accessible, restricting a second process from accessing the first memory location for a first predetermined amount of time;
attempting to access a value in a second memory location by the first process;
if the second memory location is accessible, restricting the second process from accessing the second memory location for a second predetermined amount of time; and
during the first predetermined amount of time, modifying the first memory location dependent on contents of the second memory location.

11. The method of claim 10, further comprising:
unrestricting access to the first memory location in response to an expiration of the first predetermined amount of time.

12. The method of claim 10, further comprising:
failing the modifying if the first predetermined amount of time elapses prior to completion of the modifying.

13. The method of claim 12, further comprising:
retrying the modifying in response to the failing.

14. The method of claim 10, wherein the first predetermined amount of time is equal to the second predetermined amount of time.

15. The method of claim 10, wherein the first predetermined amount of time is shorter than the second predetermined amount of time.

16. The method of claim 10, further comprising:
queuing a request to access at least one of the first memory location and the second memory location, the request being invoked during at least one of the first predetermined amount of time and the second predetermined amount of time.

17. A computer system, comprising:
a plurality of processors;
a memory shared by the plurality of processors, the memory comprising a first memory location and a second memory location; and
a controller configured to:
in response to one of the plurality of processors, request exclusive access to the first memory location for a first predetermined amount of time;
if the request to the first memory location is granted, request exclusive access to the second memory location for a second predetermined amount of time; and
if the request to the second memory location is granted, modify the first memory location dependent on contents of the second memory location.

18. The computer system of claim 17, wherein, during the exclusive access to the first memory location, only the one of the plurality of processors is allowed access to the first memory location, and wherein, during the exclusive access to the second memory location, only the one of the plurality of processors is allowed access to the second memory location.

19. The computer system of claim 17, wherein the first predetermined amount of time is equal to the second predetermined amount of time.

20. The computer system of claim 17, wherein the first predetermined amount of time is shorter than the second predetermined amount of time.

21. The computer system of claim 17, wherein a request to access at least one of the first memory location and the second memory location is queued when the request is invoked during at least one of the first predetermined amount of time and the second predetermined amount of time.

22. The computer system of claim 17, wherein the controller is part of a bus shared by the plurality of processors.

* * * * *